US008952645B2

(12) United States Patent
Fraeger

(10) Patent No.: US 8,952,645 B2
(45) Date of Patent: Feb. 10, 2015

(54) DRIVE DEVICE COMPRISING A PLURALITY OF DRIVES AND REGULATING SYSTEM FOR THIS OVERALL DRIVE

(75) Inventor: Carsten Fraeger, Hameln (DE)

(73) Assignee: Lenze Automation GmbH, Meerbusch (DE)

(*) Notice: Subject to any disclaimer, the term of this patent is extended or adjusted under 35 U.S.C. 154(b) by 1407 days.

(21) Appl. No.: 12/519,053

(22) PCT Filed: Dec. 27, 2007

(86) PCT No.: PCT/EP2007/064593
§ 371 (c)(1),
(2), (4) Date: Mar. 5, 2010

(87) PCT Pub. No.: WO2008/080957
PCT Pub. Date: Jul. 10, 2008

(65) Prior Publication Data
US 2010/0188028 A1    Jul. 29, 2010

(30) Foreign Application Priority Data

Dec. 27, 2006 (DE) .......................... 10 2006 061 527

(51) Int. Cl.
G05D 23/275 (2006.01)
G05B 19/416 (2006.01)

(52) U.S. Cl.
CPC .... *G05B 19/416* (2013.01); *G05B 2219/41264* (2013.01); *G05B 2219/41325* (2013.01); *G05B 2219/49252* (2013.01)
USPC ... 318/632; 318/400.02; 318/560; 318/568.2; 318/38; 94/418; 72/453.01

(58) Field of Classification Search
USPC ............ 318/400.02, 611, 625, 685, 675, 645, 318/606, 599, 628, 3–90, 560–596, 318/800–832; 322/59, 17, 28, 44, 45, 97, 322/46; 701/67, 53, 52, 2, 22, 3, 54, 110; 700/65

See application file for complete search history.

(56) References Cited

U.S. PATENT DOCUMENTS 3,497,778 A * 2/1970 Gerber .............................. 318/8
4,888,538 A * 12/1989 Dimitrov et al. .............. 318/675
(Continued)

FOREIGN PATENT DOCUMENTS

| EP | 0583864 | 4/1993 |
|---|---|---|
| EP | 0 583 864 | 2/1994 |
| GB | 2 261 531 | 5/1993 |

OTHER PUBLICATIONS

International Search Report for PCT/EP2007/064593 mailed May 8, 2008, 2 pages.

*Primary Examiner* — Kawing Chan
*Assistant Examiner* — Jorge L Carrasquillo
(74) *Attorney, Agent, or Firm* — Hunton & Williams LLP

(57) ABSTRACT

In the case of speed-regulated high-power drives and with simultaneously high demands on accuracy or dynamics, the object of the invention is to reduce a very high level of complexity of the power electronics (high clock frequency), the motor (high precision) and mechanical transmission (low-play transmission elements). For this purpose, the invention proposes a drive device for rotational and/or t translational movements. The drive has a plurality of drives for the joint, mechanically coupled driving of a working machine or for moving a mass. It also has a control device. At least one drive is intended to provide the power (as a power drive). At least one further drive is provided and mechanically coupled as a servo-drive for controlling or regulating the accuracy and/or dynamics of the overall drive. The control device controls and regulates the at least two mechanically coupled drives.

29 Claims, 9 Drawing Sheets

(56) References Cited

U.S. PATENT DOCUMENTS

| | | | | |
|---|---|---|---|---|
| 5,072,361 A | * | 12/1991 | Davis et al. | 700/65 |
| 5,252,900 A | * | 10/1993 | Uehara et al. | 318/568.11 |
| 5,656,903 A | * | 8/1997 | Shui et al. | 318/568.1 |
| 5,905,351 A | | 5/1999 | Morishita et al. | |
| 5,992,383 A | * | 11/1999 | Scholten et al. | 123/399 |
| 5,998,954 A | * | 12/1999 | Scholten | 318/599 |
| 6,969,961 B2 | * | 11/2005 | Tolkmitt et al. | 318/34 |
| 2002/0024306 A1 | * | 2/2002 | Imai et al. | 318/34 |
| 2003/0137270 A1 | | 7/2003 | Sano | |
| 2007/0007927 A1 | * | 1/2007 | Terada et al. | 318/630 |
| 2010/0274421 A1 | * | 10/2010 | Falkenstein | 701/22 |

* cited by examiner

Fig. 4

|  | Linear Axis | Drive Data Power Drive | Control Drive |
|---|---|---|---|
| l | 10 m | | |
| v | 2.5 m/s | | |
| m | 2600 kg    2.6 t | | |
| a | 10 m/s²    1.02 g | | |
| $F_{max}$ | 26000 N    26 kN | | |
| Percentage | | 95 % | 6.5 % |
| $P_{max}$ | 65000 W    65 kW | 61750 kW    62 kW | 4225 W    4.225 kW |
| Effective load | 30 % | 18525 W    18.5 kW | 1267.5 W    1.2675 kW |
| Motor | | | Servo-motor I max. 10A |
| Device | | Frequency converter max. 133.5 A | Servo-device max. 16A |
| Gear unit | | Three-phase gear motor 87 Hz | |
| $m_{motor+gear}$ | | | 30 kg |
| $J_{motor+gear}$ | 1.29*10⁻³/kgm² | 0.075 kgm² | 0.0105 kgm² |
| Expansion | 0.2 % | | |
| c | 1300000 N/m | | |
| d | | 0.4 m | 0.2 m |
| i | | 17.2 | 1 |
| $n_{pulley}$ | | 2.0 /s    119 /min | 4.0 /s    239 /min |
| $M_{pulley\,max}$ | | 4940 Nm | 169 Nm |
| $M_{pulley\,eff}$ | | 1482 Nm | 51 Nm |
| $n_{motor}$ | | 34.2 /s    2053 /min | 4.0 /s    238.73 /min |
| $M_{motor\,max}$ | | 287.2 Nm | 169 Nm |
| $M_{motor\,eff}$ | | 86.2 Nm | 50.7 Nm |
| m* | | 554.7 | 1.05 |
| l* | | 5 m | 5 m |
| c* | | 3*10⁶ | 3*10⁶ |
| $f_?$ | | 7 Hz | 7 Hz |
| $f_z$ | | 12 Hz | 205 Hz |

Fig. 5

| | Drive Data<br>Conventional Drive with<br>Three-Phase Current | |
|---|---|---|
| | 65000 W | 66 kW |
| | 19500 W | 19.5 kW |
| | Three-phase motor - size 315L8 | |
| | Servo-device $I_{max}$ 165 A | |
| | | |
| | 1250 kg | |
| | 6.76 kgm² | |
| | | |
| | 0.4 m | |
| | 1 | |
| | 2.0 /sec | 119 /min |
| | 5200 Nm | |
| | 1560 Nm | |
| | 2.0 /sec | 119 /min |
| | 5200 Nm | |
| | 1560 Nm | |
| | | |
| | 169 | |
| | 5 m | |
| | 3*10⁶ | |
| | 5 Hz | |
| | 20 Hz | |

Fig. 6

| | Dual Drive | | Conventional Direct Drive |
|---|---|---|---|
| | Power Drive | Control Drive | Drive (conventional) |
| Data | | | |
| $P_{max}$ | 62 kW | 4.55 kW | 65 kW |
| $P_{eff}$ | 18.5 kW | 1.3 kW | 19.5 kW |
| Motor | Converter max. 133.5 A | Servo-motor $I_{max}$ 10A | Three-phase motor - size 315L8 |
| Device | Three-phase gear motor 87 Hz | Servo-device max. 16A | Servo-Device $I_{max}$ 165A |
| Gear motor | | | |
| Price | | | LP Motor 315L8 = 2*EK VEM315L8 |
| Motor | 0 € | 1,800 € | 13,510 € |
| Gear motor | 3,313 € | 0 € | 0 € |
| Converter | 4,206 € | 910 € | 6,417 € |
| Subtotal | 7,519 € | 2,710 € | 19,927 € |
| Total | 10,229 € | | 19,927 € |

DRIVE DEVICE COMPRISING A PLURALITY OF DRIVES AND REGULATING SYSTEM FOR THIS OVERALL DRIVE

CROSS-REFERENCE TO RELATED APPLICATIONS

This application is the U.S. National Stage filing of International Application No. PCT/EP2007/064593, filed Dec. 27, 2007, which claims priority to German Patent Application No. 10 2006 061 527.1, filed Dec. 27, 2006, the disclosures of which are hereby incorporated by reference.

FIELD OF THE INVENTION

Embodiments of the invention relate to a drive device for rotational and/or translational movements. The drive device comprises a plurality of drives, in particular machines, for jointly driving a working machine or for moving a mass, and a control device. In accordance with exemplary embodiments, two machines are coupled as drives. The use of the word "two" in the following disclosure is meant to be a non-limiting example and it is synonymous for the aforementioned plurality of drive machines.

BACKGROUND

When demands are very high, direct drives, e.g. linear motors, are employed for eliminating play and elasticity of a mechanical transmission. This high level of complexity is evident, in particular, in linear drives and slowly rotating direct drives. Besides the high cost, said drives have a great volume and poor efficiency.

In many applications for high-precision rotational movements, electromechanical drives are employed today. For providing the required small rotational speeds for the working machine, motor/gear combinations having low-play planetary gear units adapted for the required accuracy are employed.

Where the remaining inaccuracy of mechanics is too great due to gear backlash and elasticity of belts or chains, direct drives are employed, as described above. For realizing mechanically precise drives, for example, the following measures are applied today for improving accuracy.

Low-play gear units ensure slight angle errors by means of narrow tolerance toothing elements and play-free clutches, e.g. multiple-disk clutches, metal bellow clutches.

Torsion-proof transmission elements and gear units, e.g. planetary gear units, thick-walled housings, enhance the achievable reinforcements and also realize slight angle errors, where necessary.

Direct drives, e.g. slowly rotating synchronous motors, avoid errors caused by mechanical transmission.

What today's solutions have in common is that the drive is to be adapted for full power and the required precision. This renders the drives expensive. The described measures, in particular in connection with high power, involve a great deal of expense. The process-safe realization in production constitutes a further problem, for example, the selection of precision toothing elements for a low-play gear unit is possible with restrictions only in connection with high torques.

In the case of speed-regulated high-power drives with simultaneously high demands on accuracy or dynamics, reducing the very high level of complexity of the power electronics (high clock frequency), the motor (high precision) and mechanical transmission (low-play transmission elements) is desirable.

SUMMARY OF THE PREFERRED EMBODIMENTS

An embodiment may have a drive device for one of rotational and translational movement. The drive device may have a plurality of drives for jointly driving a working machine or for moving a mass. The drive device may have at least one drive to provide power (e.g., power drive) and at least one drive for controlling or regulating accuracy and/or dynamics (e.g., control drive). A control and regulating device may control and regulate the drives.

A further embodiment may be a control method for a drive device. The control method may include driving a working machine or moving a mass by the drive device. The drive device may have at least two drives. The two drives may jointly drive the working machine or move the mass. The two drives may be controlled by a control device. One drive of the two drives may be a power drive. One drive of the two drives may be a control drive that controls mechanical accuracy and dynamics.

Embodiments may have at least one dual drive and a regulating system for the dual drive. The dual drive may have two drives operating in parallel and variable in speed, wherein one drive provides power at low cost, and the other drive is responsible for accuracy of the overall drive.

The overall drive may have at least two separate drives (drive concept). The at least one first drive (power drive) may be optimized for providing high power at low cost, for example, by means of a low switching frequency of the frequency converter, e.g. up to 2 kHz only, sensor-free operation, a simple motor, e.g. three-phase asynchronous motor with normal speed, standard gear units with normal play for adapting motor speed to working machine speed, toothed belts for translating rotational movement into linear movement. The at least one second drive (control drive) may be responsible for accuracy of movement. It compensates the errors of the power drive.

Since low power is required for compensation, a control drive may be designed at low cost. Calculations for various drive means have shown that approximately 5% of the overall power is required for the control drive. Cooperation of the two drive means is achieved by a regulating system measuring the inaccuracies of the power drive and driving or controlling the control drive for compensation. This may be realized, for example, by means of a servo-regulator having two actual-value inputs.

Thus, the following benefits may be obtained.

At high drive powers, the major power portion may be provided by low-cost electromechanical drives comprising a converter, motor and gear unit, e.g. by available devices 8200, MDEMA, GST, GKS. Accuracy and dynamics are provided by a considerably smaller servo-drive, which servo-drive is capable of performing the entire nominal-value processing and regulation and providing the converter with nominal values.

An adapted controlling or regulating structure and two actual-value inputs, such as the ones provided in currently used Lenze drive regulators ECS, 9300 or 9400, are used for controlling or regulating.

In sum, a low-cost and light-weight drive is thus created from standard components, the properties of which drive are comparable to those of high-cost and heavy-weight direct drives.

According to exemplary embodiments, sophisticated drive objects may be achieved using low-cost components from a standard portfolio.

The drive as a "dual machine" (in the sense of a multiple drive) may be a low-cost drive for providing power and a small drive for providing accuracy. Exemplary embodiments create precision drives made of low-cost standard components such as, for example:

A linear drive having toothed belts instead of a linear motor.

A drive having a standard gear unit instead of a direct drive or a high-precision robot gear unit.

The drive (dual drive comprising two or more machines) may have considerable advantages over conventional direct drive solutions (as described in the background section):

Lower cost (almost 50% less in the example)

Lower weight (70% less in the example)

Power path configured of available components of the standard repertoire.

A plurality of first and/or second drives may be used. Exemplary embodiments may provide a drive device and method for driving a "load" via a plurality of motors. In this configuration, the term "load" is to be understood in a general sense as an object which is subject to movements provided by the drive.

Accuracy or precision may have one or more of the following properties: High resistance of the drive to disturbances and load variations, rapid regulation at high limit frequency, slight angle errors (or travel errors in linear movements), e.g. due to gear backlash, clutch play, control variations.

The control device for the drive device for rotational and/or translational movements may control and regulate the at least two drives.

The control drive may be provided with a difference between a nominal speed value (v,ω) for the overall drive and an actual value of an encoder (or an observer) of the power drive, which difference is multiplied by a factor and provided to the control drive as a nominal value. Thus, the control drive may be caused to completely, or at least substantially, compensate rotational and/or translations errors of the power drive.

The drive device may be provided with a plurality of drives for jointly driving a working machine or for moving a mass as a "load". At least two drives may be provided. At least one drive is intended to provide power (power drive). At least one drive is a control drive, that provides for readjustment of mechanical accuracy and/or required dynamics. The control device may drive and control the at least two drives.

According to exemplary embodiments, aside from electric machines (e.g., electric drives), the drives may be pneumatic drives, hydraulic drives, drives comprising combustion engines or turbo-machines, or combinations of said drives, in particular comprising a mechanical gear unit, hydraulic gear unit or coupling unit.

The drives may be, at least in part, electric motors which are each fed by a power electronics unit. At least one power drive may be a gear motor.

At least one of the drives may be realized as a brake, in particular as an electric motor having a converter feeding a braking chopper. At least one power drive may be a pneumatic cylinder or hydraulic cylinder.

The at least one control drive may be an electric motor or electric linear motor which is, in particular, equipped, at least in part, with one or a plurality of permanent magnets.

The conversion of a rotational movement into a linear movement may be accomplished by an arrangement of rods, a rack, a toothed belt or a spindle.

An elastic coupling element may be provided for coupling each of the at least two drives to the working machine or mass, in particular in form of a hollow shaft or from both axial sides for spaced input of driving force from the at least two drives, i.e. the power drive and the control drive.

A plurality of control drives may control the at least one power drive, in particular by mechanically actuating at least one valve of a hydraulic or pneumatic drive by one of the control drives.

The at least one power drive may have at least one sensor for measuring the movement of the power drive, wherein the at least one control drive may also have a sensor for measuring the movement of the control drive. At least one of the movement sensors may be replaced or supplemented by an observer.

A control unit may evaluate the movement of the at least one power drive and uses this signal for controlling the at least one control drive, such as by a movement sensor located close to the shaft of power drive. A further control unit may evaluate the movement of the control drive and control the control drive.

The sensor for measuring the movement may be a tachogenerator, a resolver, an acceleration sensor, an optical incremental encoder, a magnetic incremental encoder, an optical absolute-value encoder or a magnetic absolute-value encoder, which may be attached to the shaft of the power drive or close to the power drive.

The control unit may be able to operate with linear or non-linear parameters, such as when the control unit is an observer or a state regulator. The parameters of the control unit may be chosen such that, within a defined frequency range, the errors of the (at least one) power drive are compensated. However, the parameters of the control unit may be chosen such that, within a given frequency range, errors of the (at least one) power drive are substantially compensated.

The control unit may control the at least one power drive and the at least one control drive, which constitute the at least two drives.

Structural units may be created according to exemplary embodiments: The power drive and the control drive may be combined to form such a unit. The control drive and the control unit may be combined to form such a unit. The power electronics unit and the control unit may be combined to form such a unit, or all components may be combined to form a structural unit.

The invention is explained and supplemented by means of exemplary embodiments, wherein it should be noted that the following illustration is a description of preferred embodiments of the invention.

BRIEF DESCRIPTION OF THE DRAWINGS

FIG. 4 shows an example for selecting a drive concept for a linear drive.

FIG. 5 is a compilation of components of a conventional direct drive.

FIG. 6 is a comparison of prices of the dual drive and the conventional drive.

DETAILED DESCRIPTION OF THE PREFERRED EMBODIMENTS

Figure 1:
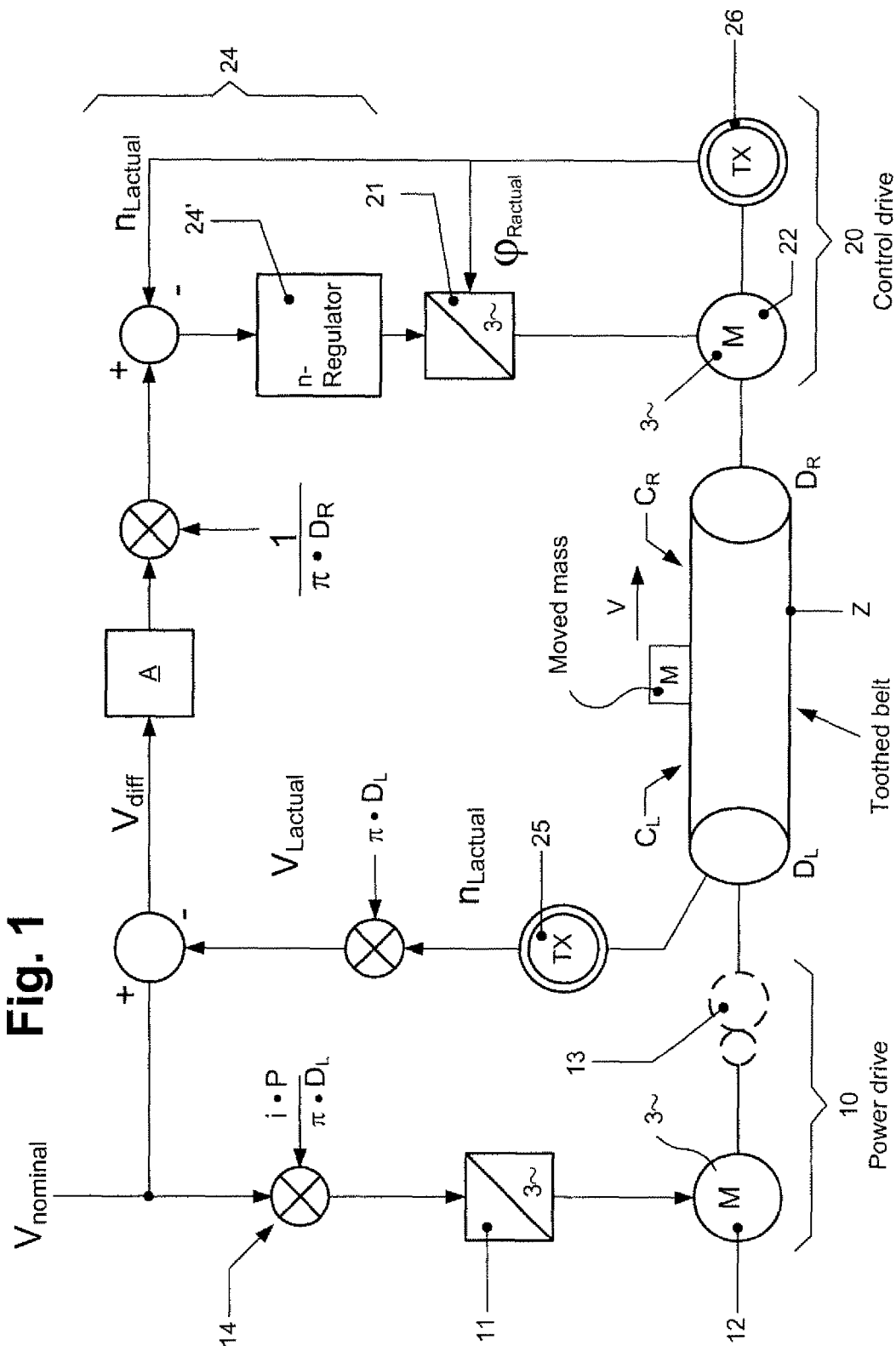
FIG. 1 is a block diagram of a linear drive comprising a dual drive.
Figure 3:
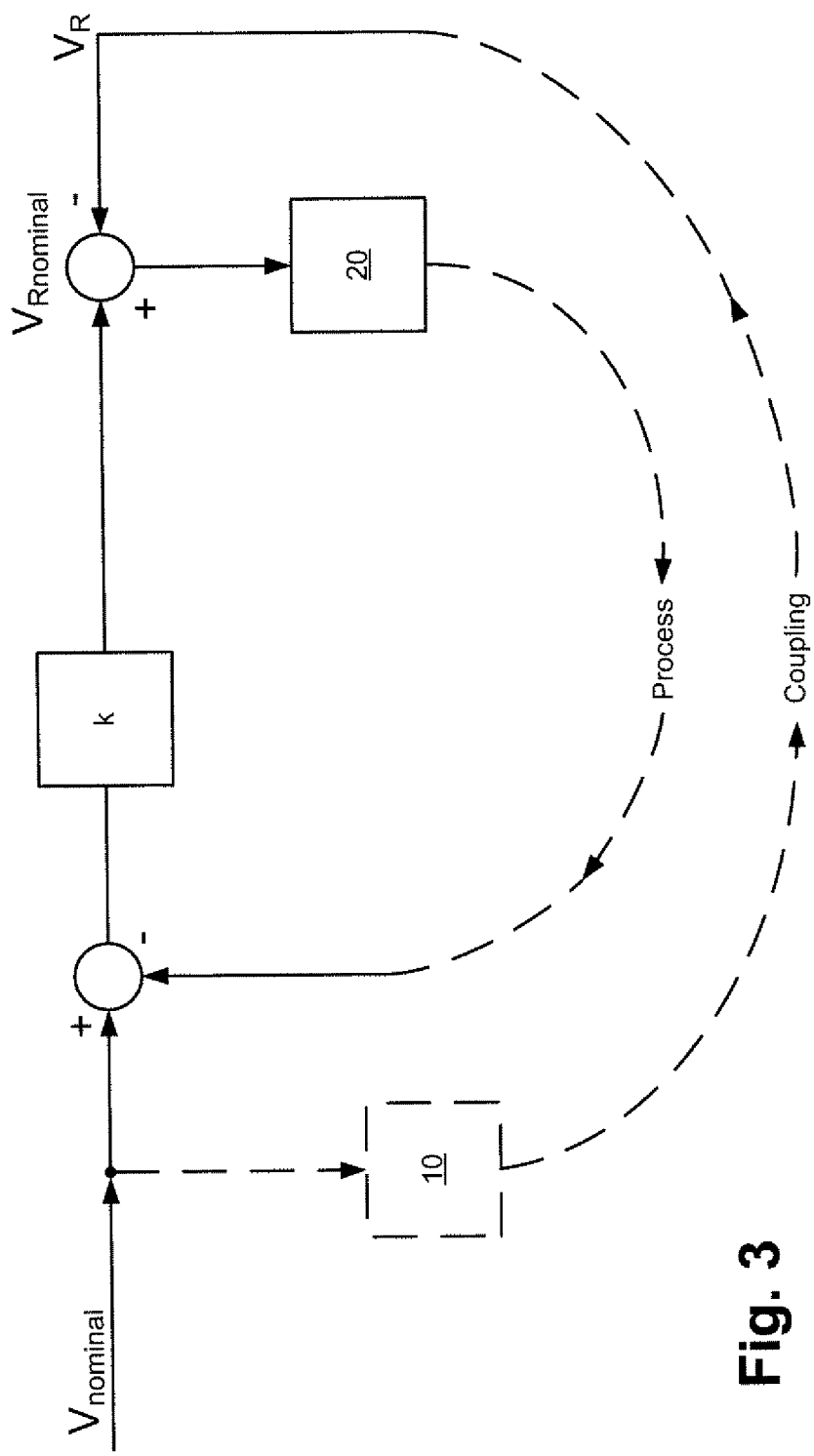
FIG. 3 is an enlarged control circuit controlling the left-hand drive 10 and regulating the speed of the right-hand drive 20. This control circuit may also be employed in other concepts such as the one shown in FIG. 2.

By way of non-limiting example, the structure is explained by means of a linear drive. The following illustrations show the structure of the drive device, please compare FIGS. 1 and 3 which depict the control unit. A list of symbols used in the description is provided at the end of the specification.

The power drive 10 may consist of a frequency converter 11, a three-phase motor 12 and a gear unit 13. The control system 14 drives the converter 11. The control system is provided with a nominal value, $V_{nominal}$, as a control parameter. The gear unit drives the toothed belt Z for linear movement v. Due to the belt tension, the toothed belt is connected to the toothed belt wheel free of play. A rotary encoder TX or 25 is connected to the toothed belt wheel. Alternatively, the rotary encoder may be connected to the toothed belt free of play via a separate wheel.

The control drive 20 may drive a toothed belt pulley at the other end of the toothed belt. The control drive comprises a speed-controlled servo-drive having a servo-motor 22 and a converter 21. The rotary encoder 26 drives the control unit 24. The rotary encoder is coupled to the motor 22. Regulator 24' is provided in form of an n-regulator in the control device 24. The control device also provides the actual value using a factor $\underline{A}$ and the differentiator; the regulator 24' itself fulfils the function "n-regulator" according to FIG. 1, for example, in form of an common integral regulator or PI regulator or a low-pass of the second order (simplified).

The control drive may be provided with the difference $V_{diff}$ between the nominal speed value $V_{nominal}$ for the overall drive and the actual value $V_{Lactual}$ of the encoder TX or 25 located at the toothed belt pulley of the power drive 10 as a nominal value. This difference is multiplied by a factor $\underline{A}$ and provided to the control drive 20 as a nominal value such that the control drive completely, or at least almost or substantially, compensates the errors of the power drive, see FIG. 3.

Figure 2:
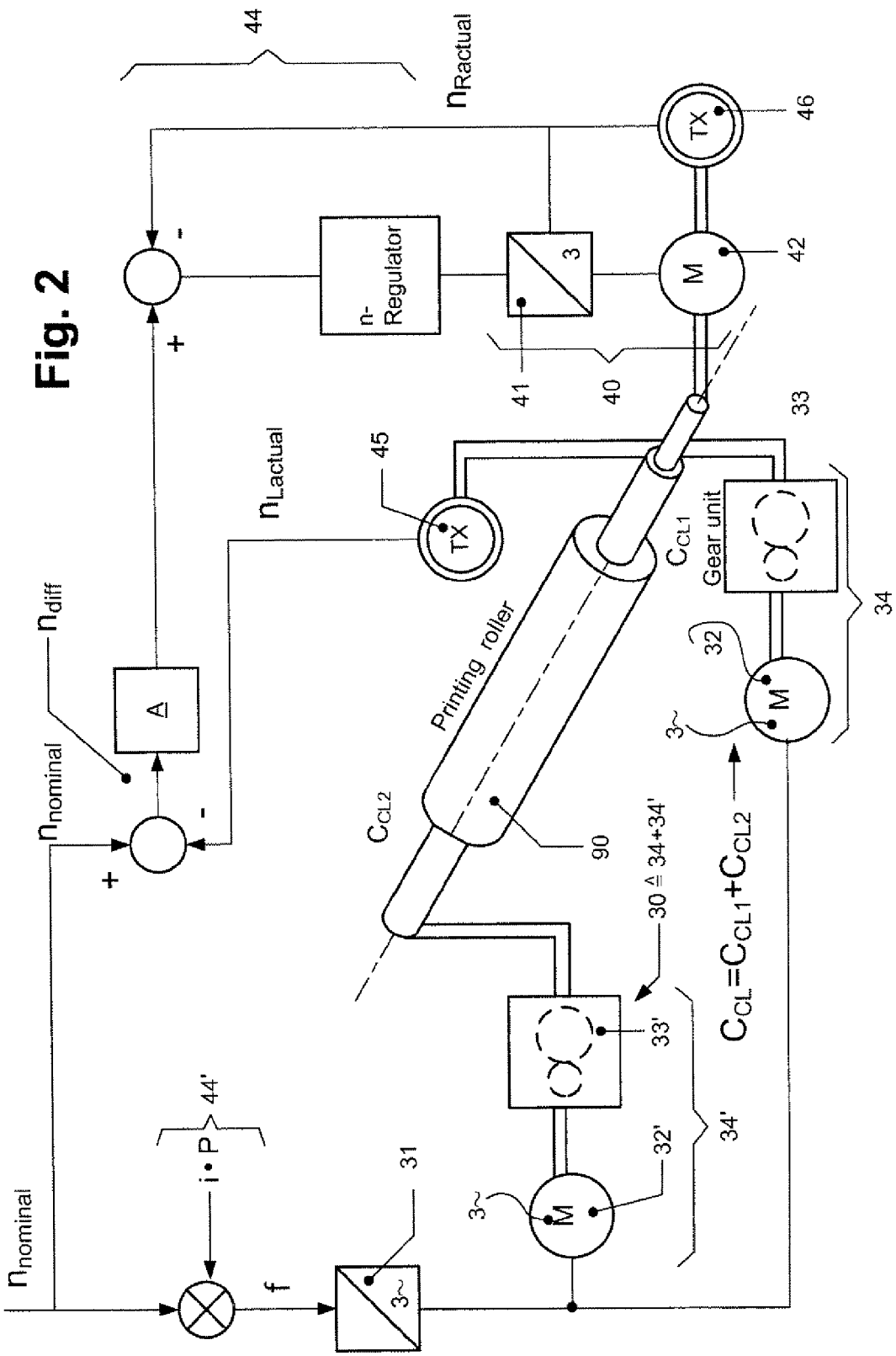
FIG. 2 is a block diagram of a roller drive comprising a multiple drive.

FIG. 2 is a block diagram of a roller drive having a printing roller 90 and two drive sides for load drive and control drive. The power drive 30 may have two gear motors 34, 34'. Each one of said gear motors may be a three-phase motor 32, 32' and an associated gear unit 33, 33'. Each motor 32, 32' is fed by a frequency converter 31 which is controlled by a control system 44'. The mechanical coupling of each of the gear units 33, 33' is provided by means of a respective torsionally flexible hollow shaft each, one provided on the one side and one provided on the opposite axial side of the printing roller 90. Each torsionally flexible hollow shaft has a certain stiffness. For example, the stiffness of the hollow shaft towards gear unit 33 is $C_{CL1}$, whereas the stiffness of the opposite hollow shaft towards gear unit 33' is $C_{CL2}$.

A rotary encoder TX or 45 may be coupled to the one hollow shaft. The rotary encoder provides a signal on rotational speed and/or, if necessary, on the position (in this example a rotational position or angle) to the following control circuit.

A control drive 40 may be provided as depicted on the right-hand side of the illustration. The control drive 40 may have a motor 42 and a converter 41 feeding it. It drives a shaft via the motor 42. The shaft has a torsional stiffness $C_{CR}$. The control drive 40 may not be a gear unit, but is coupled to a further rotary encoder 46 which provides a rotational speed and/or, if necessary, the position, as its output signal, to the control circuit 44. The control circuit is adapted for driving the converter 41 via a speed regulator.

The control drive 40 is provided with a regulating signal originating from the regulator 44. For example, the regulator 44 may be provided with a value, which is proportional to the difference between the nominal speed value $n_{nominal}$ (for the overall drive) and the actual value $n_{actual}$ of the encoder 45, as a nominal value $n_{diff}$. As the encoder 45 is coupled to the hollow shaft of the power drive, the actual value is referred to as $n_{Lactual}$. By multiplying the formed difference by an amplification factor A (greater or smaller than "1"), proportionality $\underline{A}*n_{diff}$ is generated as a nominal value for the controller 44.

Due to this circuit structure, such a control or regulating system of the control drive 40 is created that it compensates the errors of the power drive almost completely, i.e. of both power drives 34, 34' here. The control device comprises the controller 44 and the control system 44' and controls at least two machines 42, 34, in this case also a third machine 34'.

The control system 44' of the power drives fulfils its controlling function via the converter 31 and is also driven or controlled by the nominal speed value $n_{nominal}$ (for the overall drive) as shown at the top left of FIG. 2.

Calculations have shown that the control drive may not required to provide more than 5% . . . 10% of the power of the power drive. Accordingly, the control drive may be designed small and at low cost.

Example of a Linear Drive

A specific example of a linear drive comprising the following data illustrates the concepts, for example, FIG. 4.

By means of this dual drive, the overall drive approximately obtains the same characteristics as if the high power of 65 kW was transmitted to the toothed belt by a direct drive without gear unit.

Controlling or Regulating System

To enable the control drive to completely compensate the errors of the power drive, amplification $\underline{A}$ is suitably chosen. Amplification $\underline{A}$ may be determined using the example of the linear drive.

The power drive comprising a converter, motor and gear unit has a non-linear transfer function $\underline{L}$ and the control drive comprising a converter, motor and regulating system has a linear transfer function $\underline{R}$:

$$n_{Lactual} = L \cdot \frac{i \cdot p}{\pi \cdot D_L} \cdot \frac{1}{i \cdot p} \cdot v_{nominal}$$

(N.B.: Despite the non-linear relationships, the complex representation is chosen in a simplified manner.)

$$n_{Ractual} = R \cdot \frac{1}{\pi \cdot D_R} \cdot A \cdot (v_{nominal} - v_{Lactual})$$

The speed $\underline{v}$ of mass m results from the coupling of the two drive means via the toothed belt from a superimposition of the two rotational speeds.

$$\underline{v} = \underline{C}_{CL} \cdot \pi \cdot D_L \cdot n_{Lactual} + \underline{C}_{CR} \cdot \pi \cdot D_R \cdot n_{Ractual}$$

Wherein $\underline{C}_{CL}$ and $\underline{C}_{CR}$ are the transfer functions between the toothed belt wheels and mass m.

For compensating the errors of the power drive, amplification $\underline{A}$ is chosen as follows:

$$\underline{A} = \frac{C_{CL}}{C_{CR}} \cdot \frac{1}{R}$$

By means of this amplification, the errors of the power drive are completely compensated, wherein the required amplification is finite if only a limited frequency range is considered:

$$\underline{A}' = \frac{C_{CL}}{C_{CR}} \cdot \frac{1}{R} \text{ within range } \omega = 0 \ldots \omega_{limit}$$

The transfer functions between power drive and control drive and mass result from the elasticity of the toothed belt as a function of the current position. Toothed belt elasticities, mass and damping yield the transfer functions:

$$\underline{C}_{CL} = \frac{c_L}{c_L + c_R} \frac{1 + D\frac{s}{\omega_{0L}}}{1 + D\frac{s}{\omega_{0L}} + \left(\frac{s}{\omega_{0L}}\right)^2}, \omega_{0L} = \sqrt{\frac{c_L + c_R}{m}}$$

$$\underline{C}_{CR} = \frac{c_R}{c_L + c_R} \frac{1 + D\frac{s}{\omega_{0R}}}{1 + D\frac{s}{\omega_{0R}} + \left(\frac{s}{\omega_{0R}}\right)^2}, \omega_{0R} = \omega_{0L} = \sqrt{\frac{c_L + c_R}{m}}$$

Elasticity is dependent on the current position. If the point of origin is placed in the middle, the following results with respect to elasticity:

$$c_R = c \cdot \frac{l}{l - 2x}$$

$$c_L = c \cdot \frac{l}{l + 2x}$$

Thus, amplification $\underline{A}$ for complete elimination of the errors of the power drive results:

$$\underline{A} = \frac{c_L}{c_R} \cdot \frac{1}{R} = \frac{l - 2x}{l + 2x} \cdot \frac{1}{R}$$

This means amplification is finite within a limited frequency range and may be achieved without any problems as to stability. Adjustment to the current position is performed by means of the position (of the moved mass m) which is measured anyhow.

The transfer function $\underline{G}$ of the overall drive then is as follows:

$$\underline{G} = \underline{C}_{CL} = \frac{c_L}{c_L + c_R} \frac{1 + D\frac{s}{\omega_{0L}}}{1 + D\frac{s}{\omega_{0L}} + \left(\frac{s}{\omega_{0L}}\right)^2}$$

$$\underline{v} = \underline{G} \cdot v_{nominal}$$

The control drive 10 or 30 (of 34', 34) serves the purpose of correcting errors in movement/position. Its required power is thus a function of the level of the errors of the power drive, wherein the nature of the error is relevant for the correction performance of the control drive. Various error mechanisms and the influence of gear backlash are considered in the following.

Power may be divided for compensating a torque error. Errors of this kind may be generated in drives operated by converters due to electromagnetic variations of the power drive and regulating differences from the nominal value. They may also result from a temperature drift of the torque/current characteristic or variations between motor model and motor or direct-current portions of the converter and imbalances in the output current.

Figure 1A:
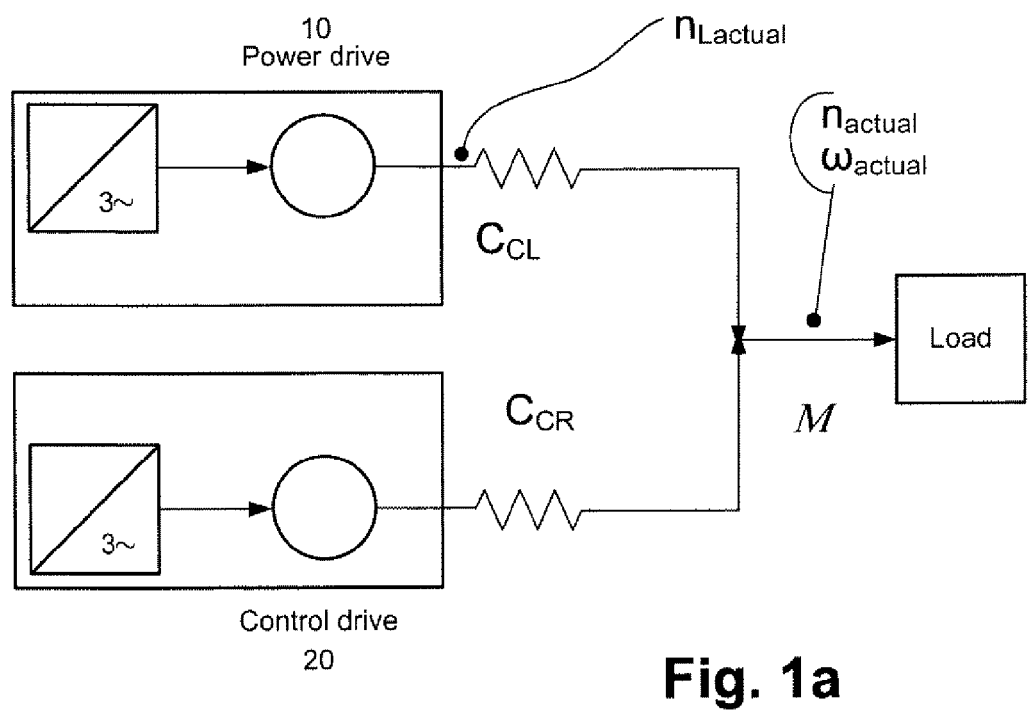
FIG. 1a is a schematic illustration of FIG. 1, wherein the overall drive is separated into two partial drives. One partial drive 10, the power drive, provides the required mechanical power. The second partial drive 20, the control drive, serves the purpose of correcting errors caused by the power drive.

According to FIG. 1a, both drive means 10 and 20 act upon load via elastic transmission elements CCL and CCR and collectively generate torque M. The power drive generates torque $M_{LA}$ comprising the error $\Delta M_{LA}$.

If the variation is constant in time, the control drive, in stationary operation, will compensate the error and provide torque $M_{RA}$ which is (theoretically) equal to torque error $\Delta M_{LA}$. It is virtually substantially equal. The control drive provides a corresponding power.

However, said errors often are periodic torque variations. The torque error then has an approximately sinusoidal variation in time.

Due to the elasticity between control drive and load, the control drive may travel an angle in addition to load as a function of the torque error. This results in additional angular speed and acceleration of the control drive. The control drive may provide additional torque for acceleration for this purpose and thus have/provide a higher power as compared to the stationary torque error.

In drives having a gear unit, variations often occur in form of a division error, which manifests itself in form of an angle error between power drive and load. This is caused by variations in the toothing and eccentricities of the gear so wheels and shafts of the gear unit, in which case power is divided for compensating the angle error. For example, a pinion having a pitch circle diameter of 60 mm and a pressure angle of 30° is considered as an example here. A radial run-out of the pinion of 50 μm leads to a tangential error of 25 μm, which results in an angle error of ±3 arcmin. The error of, in total, 6 arcmin may be compensated by the control drive.

For this purpose, the control drive may be able to accelerate the overall drive to such an extent that the angle error is eliminated. The torque used for this purpose is proportional to inertia and the angle error and is square-law related to rotational speed.

A gear backlash manifests itself in form of an angle error during a change of load (during reversal of torque or force). If a (first) power drive is mechanically coupled to a (first) control drive, the control drive provides the entire torque during the period of time in which the (first) power drive is unable to transmit torque to due to the backlash. Power is then divided for compensating the gear backlash.

Comparison to Direct Drive Solution as to Technique and Cost

The dual drive—as an example of a drive having a plurality of active machines or "drive means"—may roughly have the same characteristics as if the high power of more then 65 kW was transmitted to the toothed belt via a direct drive without gear unit.

In this case, for example, the following components would be required for the direct drive, for example, see FIG. 5.

The weight of the conventional drive may be thus almost four times greater than that of the dual drive and its natural frequency is 30% less.

In FIG. 6, the prices of a realization comprising a dual drive (two drive means) are listed in comparison to those of a conventional direct drive. In sum, the price of the dual drive according to the example is almost 50% less than that of the conventional drive.

The dual drive (as well as the multiple drive) thus may have the following advantages:

Lower cost (almost 50% less in the example)

Lower weight (70% less in the example)

Higher natural frequency (40% greater in the example)

Power path configured of standard components.

The method explained here using the example of a linear drive comprising toothed belts (and of a roller drive) may be applied to a great variety of mechatronic drives.

| In lieu of | Now |
|---|---|
| Linear motor → | Linear drive comprising toothed belts and two rotating drive means. |
| Linear motor → | Linear drive comprising a rotating motor and a small linear motor for the control drive. |
| Direct drive → | Drive with standard gear unit. |
| High-precision robot gear unit → | Standard gear unit. |

In sum, solutions for precision drives may be produced from low-cost standard components. Applications include, for example:

Cross cutters (synchronized to web speed).

Printing machines (synchronized to printer's imprint).

Positioning drives for great masses, e.g. work-piece carriers.

The dual drive may be combined with further drives which may be incorporated into the regulating system, if necessary. Some of the drives may also have a braking function in form of a direct brake or a braking drive, in particular when comprising a braking chopper, or in form of an electric feedback drive having a direct voltage intermediate circuit and entropy generator.

Further Exemplary Embodiments

A Drive Having a Servo-Drive and Three-Phase Gear Motor
 a) Exemplary Embodiment
  Printing rollers of a printing machine comprising individual drive means.
 b) Power Drive
  Three-phase motor connected to power supply and comprising a gear unit with play; rotational movement measured at gear output; elastic connection to working machine.
 c) Control Drive
  Servo-motor without gear unit; driven by a power electronics unit comprising speed and/or positional control; rotational movement measured in servo-motor; elastic connection to working machine.
 d) Description
  The three-phase gear motor is operated while connected to mains supply, whereby it provides high power at low cost. However, rotational speed is dependent upon load and movement is not synchronized with the other drive means of the printing machine.
  The control drive compares the variation of the angle of rotation of the three-phase gear motor to the nominal value of the angle of rotation at the gear output. The variation is used for driving the servo-drive correcting the angle of rotation. Since the signal provided at the gear output and influenced by the angle error of the gear motor is used for regulation, the error of the three-phase gear motor can be completely compensated by the servo-motor.

A Drive Having a Pneumatic Cylinder and Servo-Motor
 a) Exemplary Embodiment
  Robot arm.
 b) Power Drive
  Pneumatic cylinder, the valves of which are controlled by the control drive.
  The pneumatic cylinder is elastically connected to the end of the arm using resilience of the robot arm. The angle of rotation of the robot arm is measured.
 c) Control Drive
  Permanent-magnet excited synchronous servo-motor; power electronics unit comprising angle regulator; angle of rotation measured in servo-motor; elastic connection of the servo-motor to the end of the robot arm via an arrangement of rods. The pneumatic valves are driven by the motor.
 d) Description
  The pneumatic cylinder provides the majority of force or power for moving the arm. Since this movement is only inaccurate, said movement is corrected by the servo-motor. The angle of rotation of the robot arm provides the erroneous movement by the cylinder for correction of movement by the servo-drive. Since the pneumatic cylinder is driven by the servo-motor, electromagnetic valves or even controlled valves are not required. The servo-motor improves both, accuracy of position and reaction time, e.g. in response to disturbances, A Drive Having a Gear Motor with Frequency Converter and Servo-Motor as a Direct Drive without Gear Unit
 a) Exemplary Embodiment
  Printing roller drive.
 b) Power Drive
  Three-phase gear motor with standard gear unit and frequency converter; angle of rotation measured at gear output; elastic connection to printing roller.

c) Control Drive

Servo-motor; servo-converter; angle of rotation measured in servo-motor; elastic connection to printing roller.

d) Description

The three-phase gear motor with frequency converter provides power at low cost. Rotational speed may be adapted to the desired facility speed by means of the frequency converter. However, due to torsional play and the translational error of the standard gear unit, the movement of printing cylinder is not sufficient for providing a good printing result. The servo-motor comes into action here by correcting the movement of three-phase gear motor. Since the servo-motor also improves the dynamic characteristics, the printing roller may be readjusted to meet dynamic requirements and is able to follow the signals of the passer control, e.g. in multi-color printing.

Figure 9:
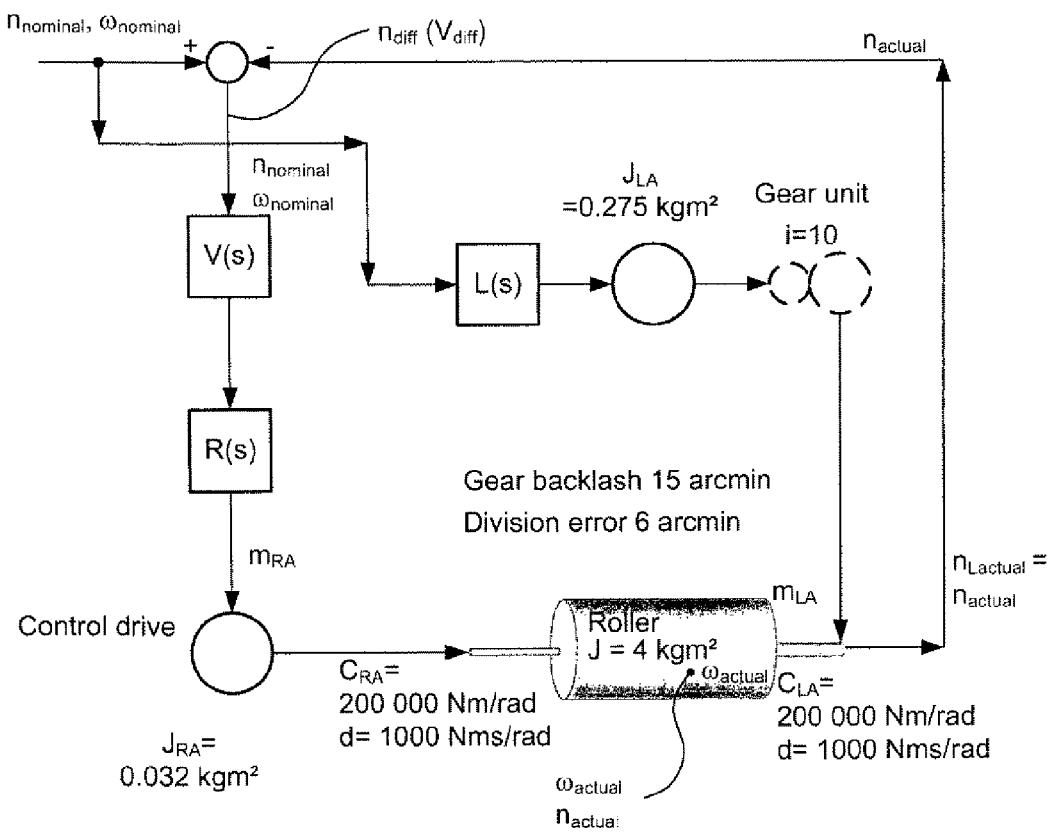
FIG. 9 is an example of a roller drive with gear backlash for explaining FIGS. 7 and 8 at a power of more than 20 kW. The power drive is a three-phase gear motor comprising a frequency converter. The gear unit drives the roller via a torsionally flexible shaft having stiffness $C_{L4}$. A rotary encoder is connected to the shaft. Physical values are indicated.

A non-limiting example of a drive having a nominal power of 37 kW is intended to illustrate the results above. The drive is simulated by way of example at 180 1/min and 2000 Nm. The drive is operated as a synchronous drive and is required to track small variations in nominal value about a mean rotational speed as good as possible. An asynchronous gear motor with frequency converter is employed as a power drive. A gearless permanent-magnet servo-motor with servo-converter is used as a control drive. Further data may be taken from FIG. 9.

Figure 7:
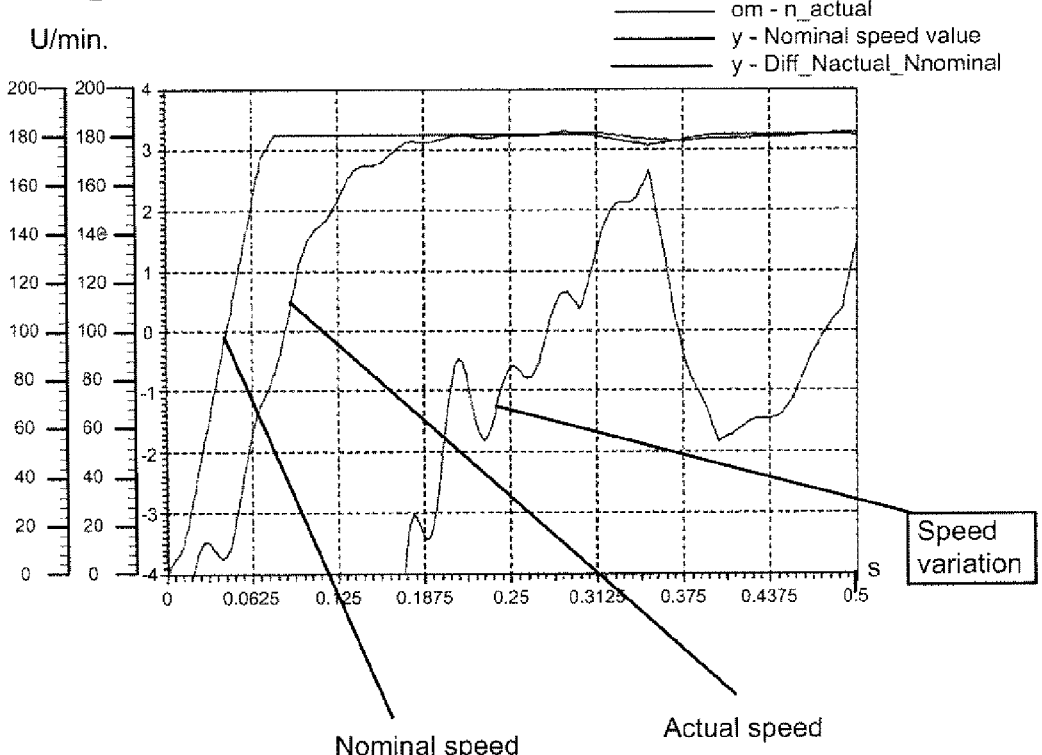
FIG. 7 is a timing diagram of the nominal speed, actual speed and speed variation in a power drive.

FIG. 7 shows the variation in time of nominal speed, actual speed and speed variation in the power drive. FIG. 7 shows the variation in time of the rotational speed of the power drive without intervention of the control drive. The nominal speed has a saddle after the run-up to 180 1/min representing the intervention of a superimposed angle synchronization regulating system. It can be clearly seen that the power drive follows the nominal value with great delay only and hardly reacts to the changes in nominal value at all. Accordingly, the difference between nominal speed and actual speed shows variations of 4.5 1/min.

Figure 8:
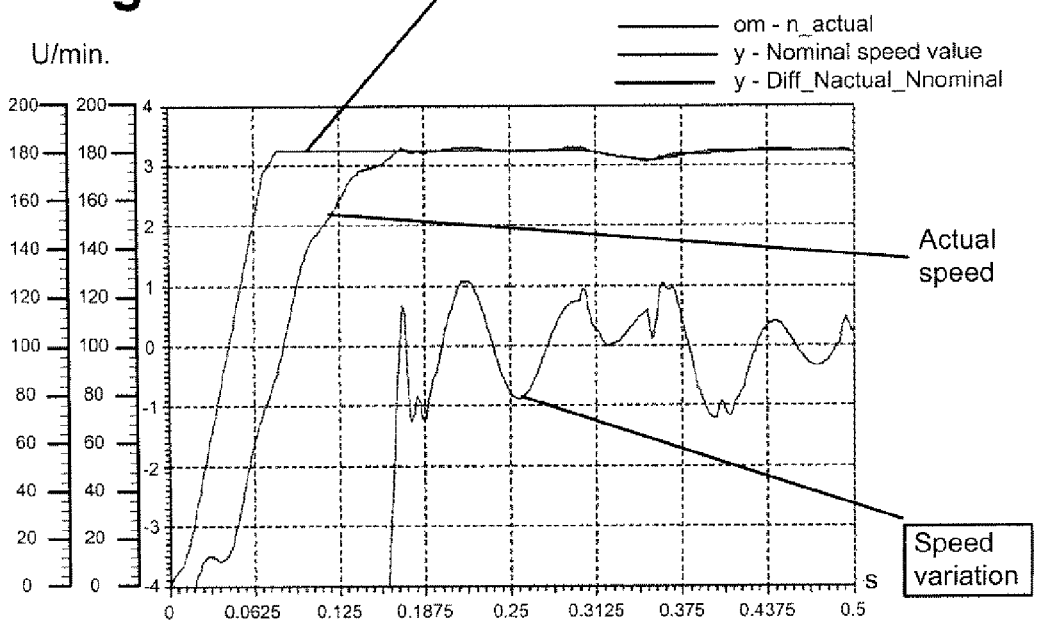
FIG. 8 is a timing diagram of the nominal speed, actual speed and speed variation in a dual drive under intervention of the control drive.

FIG. 8 shows the variation in time of rotational speed under intervention of the control drive and according to the previous examples of the additional drive means. The control drive is incorporated via a highly simplified transfer function with low-pass of the second order. By means of this very simple regulating system, the speed variation may already be reduced to less then half of the original value, i.e. to approximately 2 1/min.

LIST OF SYMBOLS USED $n_{Lactual}$ Actual rotational speed of power drive
$\underline{L}$ Transfer function of power drive
i Gear ratio
p Number of pole pairs of motor
$D_L$ Diameter of pulley of power drive
$v_{nominal}$ Nominal rotational speed
$n_{Ractual}$ Actual rotational speed of control drive
$\Lambda$ Transfer function of regulator for complete compensation
$D_R$ Diameter of pulley of control drive
$\underline{A}'$ Transfer function of regulator for substantial compensation within a limited frequency range
$\underline{v}$ Speed
$\underline{C}_{CL}$ Transfer function of elastic connection of power drive to load
$\underline{C}_{CR}$ Transfer function of elastic connection of control drive to load
$\omega$ Angular frequency
$\omega_{limit}$ Maximum angular frequency of transfer range
D Damping factor
c Stiffness
$c_L$ Stiffness between power drive and load
$c_R$ Stiffness between control drive and load
$\omega_0$ Damped natural angular frequency
$\omega_{0L}$ Damped natural angular frequency of elastic connection of power drive to load
$\omega_{0R}$ Damped natural angular frequency of elastic connection of control drive to load
l Length
x Current position
s Laplace transform
m Mass
$\underline{G}$ Overall transfer function of drive The present invention is not limited to the aforementioned embodiments. The specification and examples therein should be considered exemplary. Other embodiments of the present invention may be easily envisioned by those skilled in this art without departing from the scope of this invention, as defined in the following claims.

The invention claimed is:

1. A drive device for at least one of rotational and translational movement, the drive device comprising a plurality of drives for jointly driving a working machine or for moving a mass and a control device, the plurality of drives comprising:
    at least one power drive providing power to the working machine or moving mass, and
    at least one control drive controlling at least one of accuracy and dynamics of the working machine or moving mass,
    wherein the control device controls both the at least one power drive and the at least one control drive from a common input signal, and
    wherein the control device provides a difference value between a nominal speed value for the drive device and an actual value of an encoder of the at least one power drive, the difference value is multiplied by a factor and provided to the at least one control drive as a nominal value enabling the at least one control drive to compensate for errors of the at least one power drive.

2. The drive device according to claim 1, wherein the at least one power drive comprises an electric drive, a pneumatic drive, a hydraulic drive, a drive comprising a combustion engine or a turbo-machine, or combinations of thereof and the at least one control drive comprises an electric drive, a pneumatic drive, a hydraulic drive, a drive comprising a combustion engine or a turbo-machine, or combinations of thereof.

3. The drive device according to claim 1, wherein the at least one power drive and the at least one control drive each comprise an electric motor supplied current from a power electronics unit.

4. The drive device according to claim 3, wherein the electric motor is equipped, at least in part, with permanent magnets.

5. The drive device according to claim 3 wherein the power electronics unit and the control device are combined to form a single structural unit.

6. The drive device according to claim 1, wherein the at least one power drive is a gear motor.

7. The drive device according to claim 1, wherein at least one of the at least one power drive and the at least one control drive is a brake.

8. The drive according to claim 7, wherein the drive device comprises an electric machine having a converter feeding via a braking chopper.

9. The drive device according to claim 1, wherein the at least one power drive is a pneumatic cylinder or hydraulic cylinder.

10. The drive device according to claim 1, wherein the at least one control drive is an electric motor or electric linear motor.

11. The drive device according to claim 1, wherein conversion of a rotational movement into a linear movement is accomplished by an arrangement of rods, a rack, a toothed belt or a spindle.

12. The drive device according to claim 1, wherein the at least one power drive and the at least one control drive are coupled to the working machine or the mass via an elastic coupling element.

13. The drive device according to claim 1, wherein the at least one control drive controls the at least one power drive.

14. The drive device according to claim 1, wherein the at least one power drive comprises at least one sensor for measuring movement of the at least one power drive.

15. The drive device according to claim 14, wherein the sensor for measuring the movement is a tachogenerator, a resolver, an acceleration sensor, an optical incremental encoder, a magnetic incremental encoder, an optical absolute-value encoder or a magnetic absolute-value encoder.

16. The drive device according to claim 1, wherein the at least one control drive comprises a sensor for measuring movement of the at least one control drive.

17. The drive device according to claim 16, wherein the sensor for measuring the movement is a tachogenerator, a resolver, an acceleration sensor, an optical incremental encoder, a magnetic incremental encoder, an optical absolute-value encoder or a magnetic absolute-value encoder.

18. The drive device according to claim 1, wherein the control device evaluates movement of the at least one control drive and controls the at least one control drive.

19. The drive device according to claim 18, wherein the control device operates with linear and non-linear parameters.

20. The drive device according to claim 19, wherein the control device comprises an observer.

21. The drive device according to claim 18, wherein the control device comprises or a state regulator.

22. The drive device according to claim 18, wherein the parameters of the control device are chosen such that, within a defined frequency range, the errors of the at least one power drive are compensated for.

23. The drive device according to claim 18, wherein the parameters of the control device are chosen such that, within a given frequency range, errors of the at least one power drive are substantially compensated.

24. The drive device according to claim 1, wherein the control device controls or drives the at least one power drive and the at least one control drive.

25. The drive device according to claim 1, wherein the at least one power drive and the at least one control drive are combined to form a single structural unit.

26. The drive device according to claim 1, wherein the at least one control drive and the control device are combined to form a single structural unit.

27. A control method for a drive device for at least one of rotational and translational movement comprising:
   driving a working machine or moving a mass by the drive device wherein the drive device comprises at least two drives,
   wherein the at least two drives jointly drive the working machine or move the mass; and
   controlling, by a control device, the at least two drives;
   wherein at least one drive of the at least two drives is configured as a power drive, and
      wherein at least one drive of the at least two drives is configured as a control drive supplying mechanical accuracy and dynamics, and
   wherein the control device provides a difference value between a nominal speed value for the drive device and an actual value of an encoder of the at least one power drive, the difference value is multiplied by a factor and provided to the at least one control drive as a nominal value for the at least one control drive to compensate errors of the at least one power drive.

28. The control method according to claim 27, wherein the at least one power drive comprises at least one sensor measuring movement of the at least one power drive.

29. The control method according to claim 27, wherein the at least one control drive comprises a sensor measuring movement of the at least one control drive.

* * * * *